J. FELDMIER.
CORN-PLANTER.
No. 193,498. Patented July 24, 1877.
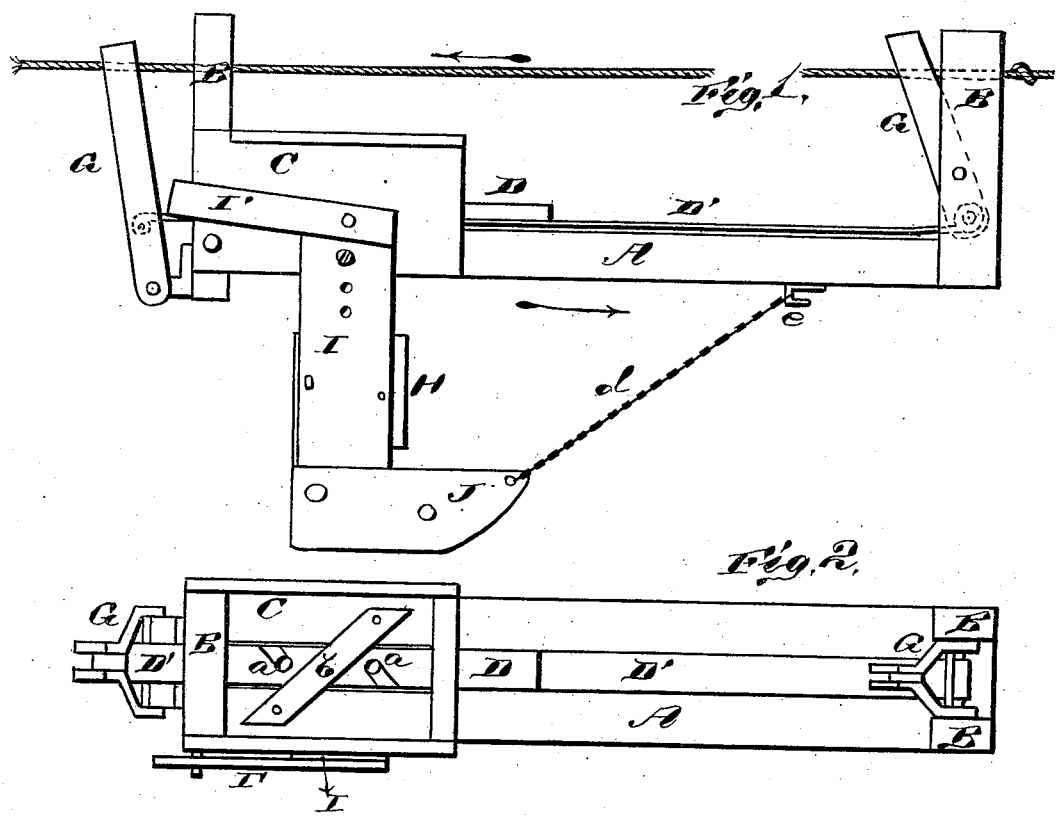

UNITED STATES PATENT OFFICE.

JOHN FELDMIER, OF LAWRENCE, KANSAS.

IMPROVEMENT IN CORN-PLANTERS.

Specification forming part of Letters Patent No. 193,498, dated July 24, 1877; application filed May 5, 1877.

*To all whom it may concern:*

Be it known that I, JOHN FELDMIER, of Lawrence, in the county of Douglas and State of Kansas, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my corn-planter, and Fig. 2 a top view of the same.

The nature of my invention consists in the construction and arrangement of a corn-dropper and check-rower to be applied to any cultivator, as will be hereinafter more fully set forth.

A represents a straight beam or bar of any suitable dimensions, provided with standards B at the front and rear ends. On the rear end of the beam A is placed the corn-box C, provided with the dropping-slide D, moving longitudinally through the center thereof. This slide is provided with two dropping-holes, *a a*, and across the top of the slide is an inclined or diagonal cut-off, *b*, as shown. The slide D is connected with two split levers, G G, pivoted one at each end of the beam A, the connecting-straps D′ being attached to said levers, one above and the other below the pivots of the levers, so as to operate in opposite directions. H is the conductor through which the corn is carried to the ground, said conductor being attached between two perforated arms, I I, which are pivoted to the sides of the beam A, and which, by means of their perforations, can be adjusted up and down, so as to regulate the depth at which the furrow-opener J is to work. This furrow-opener is attached to the lower ends of the arms I I, and its front end, by a chain, *d*, is connected with a hook, *e*, under the front end of the beam.

To use this machine its front end is to be fastened to the tongue of the cultivator, immediately in front of the double-tree, and the other part to the axle, or some other convenient place, depending upon the style of cultivator. Then attach the reel to the rear end of the tongue, and have a small pulley fastened to the front end of the tongue to carry the rope over to the next furrow. Set the stakes, with the rope attached, half way between the rows. If the weather or other cause makes the rope too slack or too loose the dropping may be regulated by the conductor under the dropper, the arms I being pivoted, and a hand-lever, I′, attached to one of them for such purpose.

The knotted rope, it will be understood, lies angling across the row of corn to be planted, and passes through the upper ends of the levers G G, each knot operating first one lever and then the other. This dropper being attached to a cultivator saves the expense of a horse-planter; it does away with the trouble of cross-marking, and can follow the plow, as it checks the rows, thus saving all the extra expense of preparing a field for planting after fall-plowing, the time and cost of a team and driver for a cross-marker, horse-planter, &c. It does the plowing and planting at one and the same time, after splitting out the stubs with a stirring-plow.

What I claim as new, and desire to secure by Letters Patent, is—

1. The combination of the beam A, corn-box C, connecting-straps D′, carrying dropping-slide D, and levers G G, constructed as described, and adapted to be attached to a cultivator, and operated by a knotted rope placed angling across the row to be planted, substantially as and for the purpose described.

2. In combination with the corn-dropper A C D D′ and forked levers G G, the adjustable perforated arm I I, lever F, conductor H, and furrow-opener J, with chain *d*, substantially as and for the purpose described.

In testimony that I claim the above I have hereunto subscribed my name in the presence of two witnesses.

JOHN FELDMIER.

Witnesses:
 CYRUS COENING,
 WILLIAM J. PATTERSON.